(12) United States Patent
Kojima et al.

(10) Patent No.: US 8,878,482 B2
(45) Date of Patent: Nov. 4, 2014

(54) POWER CONVERTING APPARATUS (75) Inventors: Tetsuya Kojima, Tokyo (JP); Yoshihiko Kinpara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 126 days.

(21) Appl. No.: 13/318,812

(22) PCT Filed: Feb. 9, 2010

(86) PCT No.: PCT/JP2010/051839
§ 371 (c)(1),
(2), (4) Date: Nov. 4, 2011

(87) PCT Pub. No.: WO2010/143452
PCT Pub. Date: Dec. 16, 2010

(65) Prior Publication Data
US 2012/0049778 A1 Mar. 1, 2012

(30) Foreign Application Priority Data
Jun. 8, 2009 (JP) ................. 2009-137053

(51) Int. Cl.
H02P 27/04 (2006.01)
H02P 6/18 (2006.01)
H02M 7/797 (2006.01)
H02M 1/00 (2006.01)

(52) U.S. Cl.
CPC ............... H02P 6/18 (2013.01); H02M 7/797 (2013.01); H02M 2001/0009 (2013.01)
USPC ........... 318/803; 318/727; 318/825; 318/487; 318/400.26; 318/801

(58) Field of Classification Search
CPC ................ G05B 11/28; G05B 2219/42237; H02P 7/29; H02P 6/085; H02P 6/14; H02P 6/16; H02P 6/182; H02P 6/08; H02P 2209/07; H02P 21/0089; H02P 2207/03; H02P 6/001; H02P 27/08; H02P 27/06; H02P 23/08; H02P 2207/01; H02P 27/042; H02P 21/10; H02P 23/0077; H02P 21/0035; G05D 3/18; H02K 29/00; H02K 29/08; B60K 1/02; B60K 6/26; B60K 6/48; H02M 7/53875; H02M 1/4233; H02M 7/5395; Y02T 10/7005; G01R 19/0092; B60L 2210/20; B60L 2220/12
USPC .............. 318/811, 494, 400.3, 701, 721, 727, 318/729, 801, 400.02, 805, 812, 299, 762, 318/798, 724, 700, 599, 400.11, 400.13, 318/400.04, 400.32, 803; 361/131, 23; 363/41, 132, 58, 98
See application file for complete search history.

(56) References Cited

U.S. PATENT DOCUMENTS

| | | | | |
|---|---|---|---|---|
| 5,834,910 A | * | 11/1998 | Tsurumi et al. | 318/139 |
| 6,556,458 B2 | * | 4/2003 | Ohmura et al. | 363/37 |
| 7,015,664 B2 | * | 3/2006 | Coles et al. | 318/400.01 |
| 7,042,191 B2 | | 5/2006 | Hirono | |
| 7,161,323 B2 | * | 1/2007 | Ajima et al. | 318/629 |
| 7,688,018 B2 | * | 3/2010 | Goto et al. | 318/599 |
| 7,898,210 B2 | * | 3/2011 | Hsieh et al. | 318/811 |
| 8,159,163 B2 | * | 4/2012 | Akiyama | 318/400.11 |
| 2007/0103950 A1 | * | 5/2007 | Arisawa et al. | 363/132 |
| 2007/0114966 A1 | * | 5/2007 | Maeda et al. | 318/811 |
| 2008/0265829 A1 | * | 10/2008 | Hayashi et al. | 318/781 |
| 2009/0052215 A1 | * | 2/2009 | Watanabe | 363/131 |
| 2009/0066286 A1 | * | 3/2009 | Gunji | 318/490 |
| 2010/0165682 A1 | * | 7/2010 | Sakakibara | 363/126 |

FOREIGN PATENT DOCUMENTS

| | | |
|---|---|---|
| CN | 101326707 A | 12/2008 |
| JP | 2 197295 | 8/1990 |
| JP | 2001 327173 | 11/2001 |
| JP | 2004 208395 | 7/2004 |
| JP | 2005 192335 | 7/2005 |
| JP | 2007 189888 | 7/2007 |

OTHER PUBLICATIONS

International Search Report Issued Apr. 27, 2010 in PCT/JP10/051839 Filed Feb. 9, 2010.

Office Action issued on Dec. 4, 2013 in Chinese Patent Application No. 201080025294.3, with its partial English translation.

* cited by examiner

*Primary Examiner* — Shawki S Ismail
*Assistant Examiner* — Jorge L Carrasquillo
(74) *Attorney, Agent, or Firm* — Oblon, Spivak, McClelland, Maier & Neustadt, L.L.P.

(57) ABSTRACT

A power converting apparatus includes a timing signal generator and a phase determination signal generator provided in an ON/OFF signal generating unit as well as a detected current correction unit. On the basis of timing signals $ts_1, \ldots$ and phase determination signals $ph_1, \ldots$, the power converting apparatus determines detected current values and phases of the detected current values fed from a DC bus current sensor at timings set in accordance with the timing signals and corrects the detected current values $idc_1, \ldots$ for the individual phases obtained at the individual timings during PWM cycles to represent values which would be obtained at reference timing $t_0$ to thereby reduce errors caused by differences in the current detecting timings for the individual phases.

18 Claims, 8 Drawing Sheets

POWER CONVERTING APPARATUS

TECHNICAL FIELD

The present invention relates to a power converting apparatus which converts DC power into AC power by using a plurality of switching means, such as semiconductor switching devices, and in particular, the invention pertains to a related current detecting technique.

BACKGROUND ART

A common method for detecting currents flowing in three phases of a three-phase inverter which serves as a power converting apparatus has been to detect currents of two phases by use of current sensors provided in two of the three phases and calculate a current of the remaining one phase utilizing the fact that the sum of the three-phase currents is zero, thereby detecting all of the three-phase currents.

There however arises a problem that the provision of the two current sensors results in a corresponding increase in cost as well as an increase in volume. A method developed to solve this problem is to provide one current sensor in a DC bus line of an inverter and reproduce three-phase currents from a DC bus current and switching states of semiconductor switching devices of the inverter.

Specifically, if currents are detected in a switching pattern of the DC bus current with which two different phase currents flow, it is possible to detect the three-phase currents utilizing the fact that the sum of the three-phase currents is zero (refer to Patent Document 1, for example).

The aforementioned method however has had a problem that if three-phase voltage commands are small or a difference between voltage commands for two phases among the three-phase voltage commands are small, the duration of time of the switching pattern becomes shorter, making it difficult to detect the currents.

A method developed under such circumstances is to make such a correction that the difference among the three-phase voltage commands becomes large enough to detect the currents in a first half of each pulse width modulation (PWM) cycle as well as such a correction in a second half of each PWM cycle that an average of voltage commands in the first and second halves becomes equal to an original voltage command. According to this method, it is possible to calculate the three-phase currents by detecting currents of two different phases in each PWM cycle (refer to Patent Document 2, for example).

PRIOR ART DOCUMENTS

Patent Documents

Patent Document 1: Japanese Laid-open Patent Application No. 1990-197295
Patent Document 2: Japanese Laid-open Patent Application No. 2001-327173

SUMMARY OF THE INVENTION

Problems to be Solved by the Invention

Regarding conventional power converting apparatuses, however, no mention has been made of a technique for calculating three-phase currents from a detected DC bus current. If currents of two phases detected at different timings are regarded as currents detected on the same time axis and used for controlling load currents, the load currents are distorted by as much as errors caused by differences in the detection timings. The same problem also occurs in a case where the three-phase currents are calculated from currents of two phases detected at different timings utilizing the fact that the sum of the three-phase currents is zero.

The present invention has been made to solve the aforementioned problems. Accordingly, it is an object of the invention to obtain a power converting apparatus which makes it possible to reduce errors caused by differences in current detecting timings for individual phases when a simple current detecting method involving calculation of the currents of the individual phases on an AC side by use of a single current sensor provided on a DC side of an inverter is employed.

Means for Solving the Problems

A power converting apparatus of the present invention includes a DC power supply, an inverter including upper-arm switching devices for n phases (where n is an integer equal to or larger than 3), each of the upper-arm switching devices having one end connected to a positive side of the DC power supply and lower-arm switching devices for the n phases connected in series with the upper-arm switching devices of the respective phases, each of the lower-arm switching devices having one end connected to a negative side of the DC power supply, the inverter being configured to supply AC voltages for the n phases to an inductive load which is connected to connecting points between the upper-arm switching devices and the lower-arm switching devices of the individual phases by controlling the upper-arm switching devices and the lower-arm switching devices to turn on and off, a current sensor for detecting a current that flows between the DC power supply and the inverter, and an ON/OFF signal generating unit for outputting ON/OFF signals to the upper-arm switching devices and the lower-arm switching devices. The power converting apparatus further includes a timing signal generator provided in the ON/OFF signal generating unit for generating timing signals used for setting timings at which currents of the individual phases flowing into the inductive load are detected, a phase determination signal generator provided in the ON/OFF signal generating unit for generating phase determination signals used for determining the phase of the current that flows in the current sensor at each of the timings set by the timing signals, and a detected current correction unit for determining detected current values fed from the current sensor at the timings set by the timing signals and phases of the detected current values on the basis of the timing signals and the phase determination signals and correcting the detected current values for the individual phases obtained at the individual timings during specific periods to represent values which would be obtained at a specific reference timing.

Advantageous Effects of the Invention

According to the present invention, the power converting apparatus including, in particular, the timing signal generator and the phase determination signal generator provided in the ON/OFF signal generating unit as well as the detected current correction unit corrects the detected current values detected by the current sensor at different timings for the individual phases to represent values which would be obtained at the same reference timing as described above. It is therefore possible to reliably obtain the detected current values for the individual phases containing reduced errors caused by differences in the detection timings.

MODES OF CARRYING OUT THE INVENTION

First Embodiment

Figure 1:
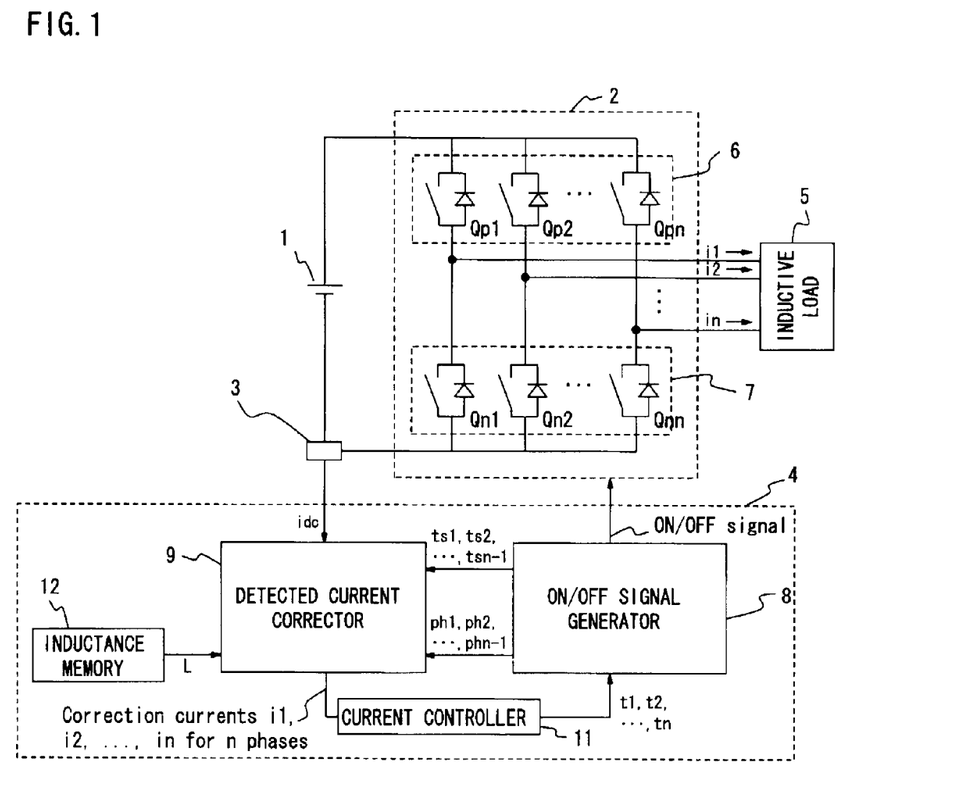
FIG. 1 is a diagram depicting the configuration of a power converting apparatus according to a first embodiment of this invention.

FIG. 1 is a circuit configuration diagram illustrating the configuration of a power converting apparatus according to a first embodiment of the present invention. The power converting apparatus includes a DC power supply 1, an inverter 2, a current sensor 3 and a control section 4, and an output of the power converting apparatus is supplied to an inductive load 5.

The inverter 2 includes upper-arm switching devices 6 for n phases (where n is an integer equal to or larger than 3), each of the upper-arm switching devices 6 having one end connected to a positive side of the DC power supply 1, and lower-arm switching devices 7 for the n phases connected in series with the upper-arm switching devices 6 of the respective phases, each of the lower-arm switching devices 7 having one end connected to a negative side of the DC power supply 1.

Incidentally, the DC power supply 1 may be any of various devices like a battery, a diode rectifier circuit or a PWM converter, for instance.

The control section 4 includes an ON/OFF signal generating unit 8, a detected current correction unit 9, a current control unit 11 and an inductance memory unit 12.

Next, operation is described. The current control unit 11 receives correction currents i1, i2, . . . , in for the n phases fed from the detected current correction unit 9 and outputs ON periods t1, t2, . . . , tn of the upper-arm switching devices 6 for the individual phases in order to supply desired electric power to the inductive load 5.

The ON/OFF signal generating unit 8 generates ON/OFF signals for turning on and off the upper-arm switching devices 6 designated by Qp1, Qp2, . . . , Qpn and the lower-arm switching devices 7 designated by Qn1, Qn2, . . . , Qnn.

Figure 2:
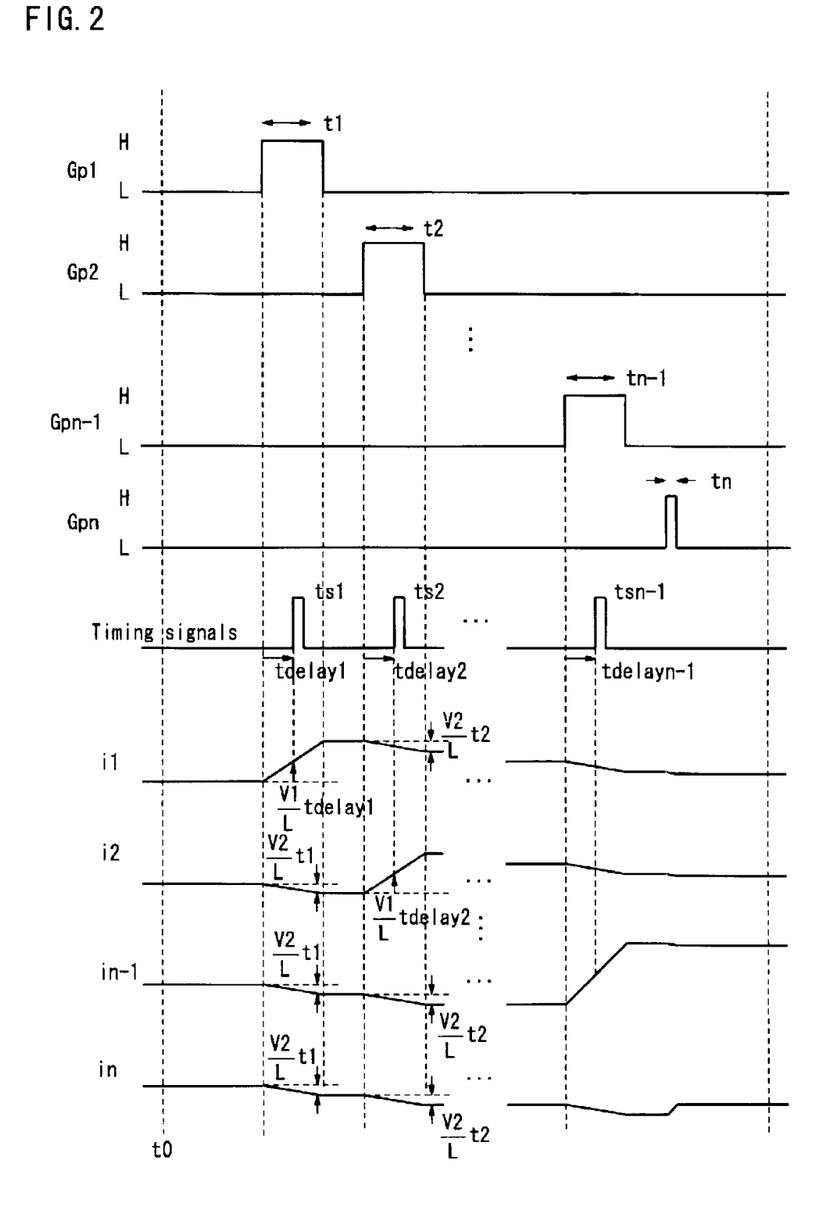
FIG. 2 is a diagram depicting operating waveforms at individual parts according to the first embodiment.

Illustrated in FIG. 2 is an example of the ON/OFF signals. When the ON/OFF signal is at a high (H) level, the relevant switching device is ON, and when the ON/OFF signal is at a low (L) level, the relevant switching device is OFF. Gp1, Gp2, . . . , Gpn which denote signals for turning on and off the upper-arm switching devices 6 designated by Qp1, Qp2, . . . , Qpn and Gn1, Gn2, . . . , Gnn which denote signals for turning on and off the lower-arm switching devices 7 designated by Qn1, Qn2, . . . , Qnn have a complementary relationship. Specifically, when Gp1 is H, Gn1 is L, for example.

In this example, it is assumed that although the ON periods t1, t2, . . . , tn−1 have sufficient lengths to allow acquisition of detected current values from the current sensor 3, the ON period to is so short that it is impossible to acquire any detected current value. Also indicated in FIG. 2 by i1, . . . , in are waveforms of currents of the individual phases that are output from the inverter 2 to the inductive load 5, the waveforms depicting how AC currents of the individual phases vary with voltages output from the inverter 2 in accordance with the ON/OFF signals.

The ON/OFF signal generating unit 8 is provided with a timing signal generator for generating timing signals ts1, ts2, . . . , tsn−1 used for setting timings at which the detected current values fed from the current sensor 3 are to be sampled and held in accordance with the ON/OFF signals as well as a phase determination signal generator for generating phase determination signals ph1, ph2, . . . , phn−1 used for determining to which phase current each of currents detected by the current sensor 3 at the timings set in accordance with the timing signals corresponds.

In the example of FIG. 2, the current that can be detected by the current sensor 3 in accordance with the timing signal ts1 is a first-phase current i1, the current that can be detected in accordance with the timing signal ts2 is a second-phase current i2, . . . , and the current that can be detected in accordance with the timing signal tsn−1 is an (n−1)th-phase current in−1.

Also, it is assumed that an mth timing signal tsm (where m is an integer chosen from 1 to n) is delayed from a rise timing of an ON signal at which the ON/OFF signal becomes H in an mth place by as much as tdelaym.

The detected current correction unit 9 is provided with a sample-and-hold portion and a current calculation portion.

When the timing signals ts1, ts2, . . . , tsn−1 are input into the sample-and-hold portion of the detected current correction unit 9, the sample-and-hold portion holds the detected current values fed from the current sensor 3 at corresponding points in time and outputs the same as DC hold currents idc1, idc2, . . . , idcn−1.

The current calculation portion of the detected current correction unit 9 performs a calculation for correcting AC-side currents of the individual phases in a later-described manner using the DC hold currents idc1, idc2, . . . , idcn−1, the phase determination signals ph1, ph2, . . . , phn−1 and inductance L of the inductive load 5 held in the inductance memory unit 12.

In the example of FIG. 2, the first-phase current i1 is determined from the DC hold current idc1 because ph1=1. Similarly, the second-phase current i2 is determined from the DC hold current idc2, . . . , and the (n−1)th-phase current in−1 is determined from the DC hold current idcn−1. Then, the nth-phase current in is determined utilizing the fact that the sum of currents flowing in the n phases is zero.

It is to be noted however that the fact that the sum of the currents of the n phases becomes zero is true only if the currents of all the phases have values detected at the same time. As will be recognized from FIG. 2, timings at which the currents of the individual phases are detected differ from one phase to another as a matter of course. For this reason, the currents detected at the timings defined by the timing signals ts1, ts2, ..., tsn−1 are corrected to represent current values at time t0 (reference timing) indicated in FIG. 2, for example.

Explained hereinbelow is how the aforementioned calculation for current correction is performed.

In the present first embodiment, the ON/OFF signals are generated in such a manner that the ON period of the upper-arm switching device 6 and that of the lower-arm switching device 7 of each phase do not overlap each other. Regarding the timing ts1 at which the first-phase current is detected, for example, the upper-arm switching device Qp1 for the first phase is ON and all the other devices of the upper-arm switching devices 6 are OFF, whereas the lower-arm switching device Qn1 for the first phase is OFF and all the other devices of the lower-arm switching devices 7 are ON.

Figure 3:
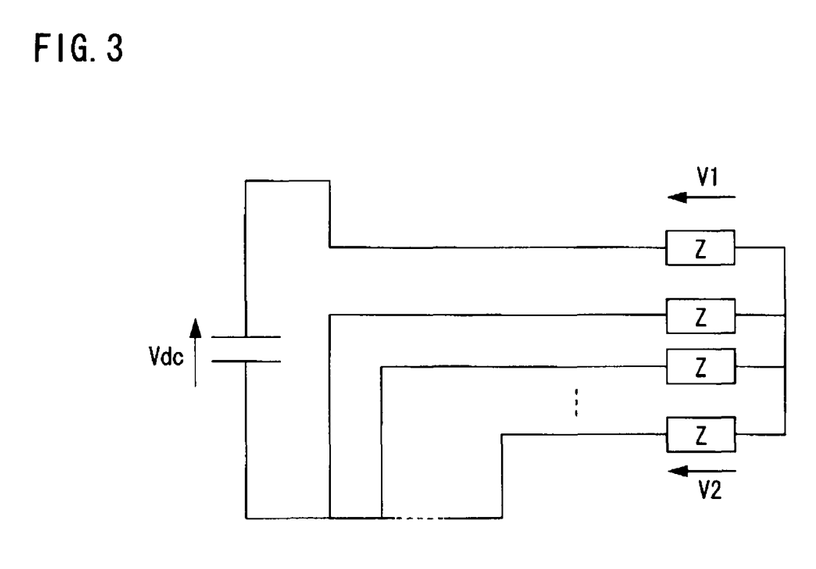
FIG. 3 is a diagram used for explaining principles of calculation of voltages V1 and V2 by equations (1) and (2)

An equivalent circuit applicable to this case is represented as shown in FIG. 3 wherein Vdc denotes voltage of the DC power supply 1 and Z denotes impedance of the inductive load 5 which is common for all of the individual phases.

Referring to FIG. 3, voltage V1 applied to the first phase with reference to an imaginary neutral point of the inductive load 5 is given by the following equation:

$$V1 = Vdc \times \frac{Z}{Z + \frac{Z}{n-1}} = \frac{n-1}{n} Vdc \tag{1}$$

Also, voltage V2 applied to each of the other phases than the first phase at the same time is given by the following equation:

$$V2 = \frac{\frac{Z}{n-1}}{Z + \frac{Z}{n-1}} = \frac{1}{n} Vdc \tag{2}$$

If equations (1) and (2) are divided by inductances of the individual phases, current change rates of the individual phases are obtained. Thus, in the example of FIG. 2, the currents of the n phases at time t0 can be calculated by the following equations:

$$\left.\begin{array}{l} i_1 = idc_1 - \dfrac{V1}{L} \times tdelay_1 \\ i_2 = idc_2 + \dfrac{V2}{L} \times t_1 - \dfrac{V1}{L} \times tdelay_2 \\ \vdots \\ i_{n-1} = idc_{n-1} + \dfrac{V2}{L} \times t_1 + \dfrac{V2}{L} \times t_2 + \ldots - \dfrac{V1}{L} \times tdelay_{n-1} \\ i_n = -(i_1 + i_2 + \ldots + i_{n-1}) \end{array}\right\} \tag{3}$$

According to the present first embodiment, the currents of the n−1 phases detected at different timings by the current sensor 3 provided on a DC side are corrected to have values which would be obtained at the same reference timing (t0) and the current of the nth phase is obtained by calculation on the basis of the sum of the corrected current values for the n−1 phases as described above. It is therefore possible to reduce errors.

While the AC-side currents of the individual phases are corrected to values at time t0 which defines the reference timing at the beginning of each successive PWM cycle in the present embodiment, the invention is not limited to this method of selecting the reference timing.

Also, while the foregoing discussion has dealt with a case where, among the currents of the n phases, the currents of the n−1 phases are detectable and the current of the remaining one phase is undetectable for reasons related to the ON periods for the individual phases in this embodiment, it is possible to correct the currents in the aforementioned manner of the present invention even when sufficiently long ON periods are available for the individual phases and the currents of all of the n phases are detectable.

Second Embodiment

While the ON/OFF signals are generated in such a manner that the ON period of the upper-arm switching device 6 and that of the lower-arm switching device 7 of each phase do not overlap each other in the foregoing first embodiment, described in this second embodiment is how the currents are corrected when the ON periods for the individual phases partially overlap.

Figure 4:
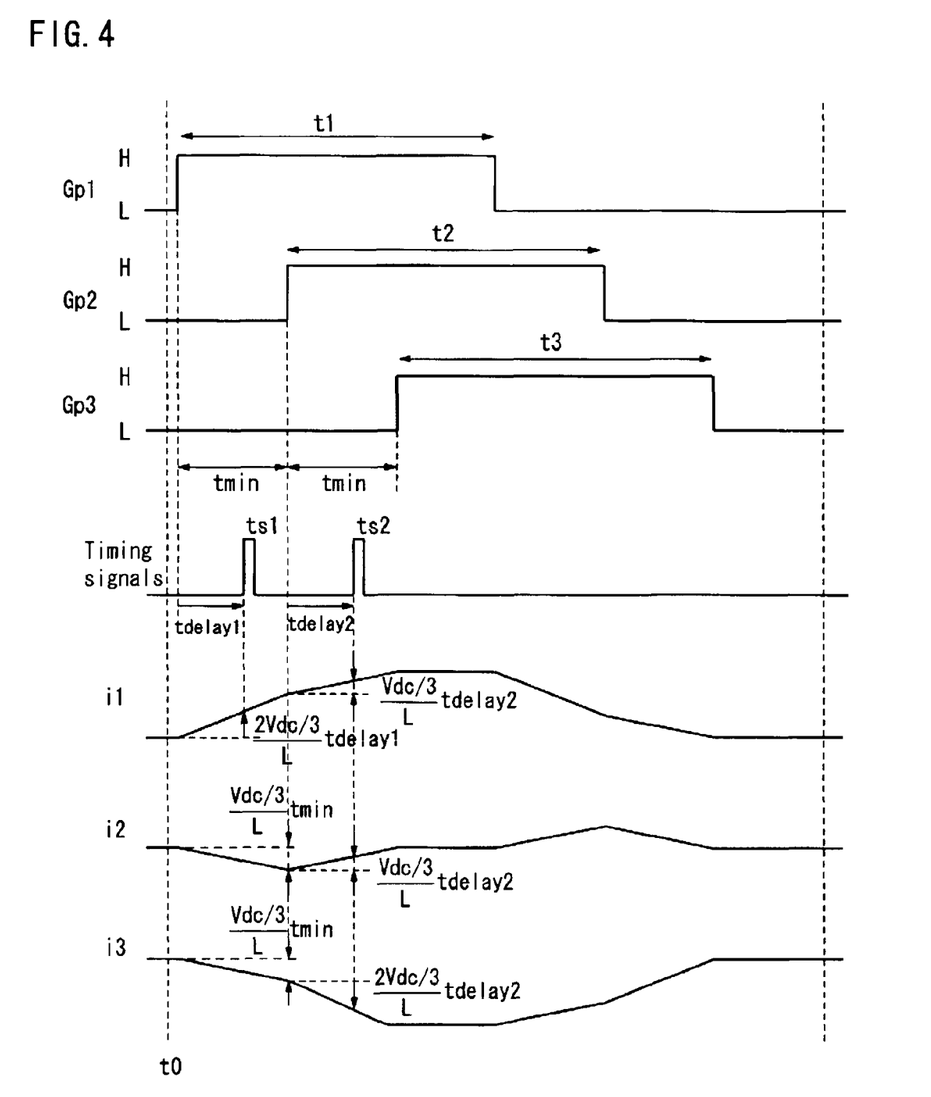
FIG. 4 is a diagram depicting operating waveforms at individual parts of a power converting apparatus according to a second embodiment of this invention.

FIG. 4 depicts ON/OFF signals generated by the ON/OFF signal generating unit 8 together with timing signals and AC currents. Here, it is assumed that the number of phases n is 3.

Signals Gp1, Gp2, Gp3 for turning on the upper-arm switching devices 6 become H at timings successively offset by as much as tmin from a situation where all of the signals Gp1, Gp2, Gp3 are at the L level, tmin representing a minimum time period necessary for determining an AC-side current from a detected value output from the current sensor 3. This minimum time period is determined by surge voltages and ringing time of a main inverter circuit as well as the performance of the current sensor, for example.

In FIG. 4, a time period during which only the signal Gp1 is H, or only the upper-arm switching device Qp1 among the upper-arm switching devices 6 is on, is as long as the minimum time period tmin, and also a time period during which the signals Gp1 and Gp2 are H, or the upper-arm switching devices Qp1 and Qp2 are on, is as long as the minimum time period tmin. Therefore, it is possible to detect AC-side currents during the respective time periods in a reliable fashion. The AC-side currents detected during these time periods correspond to i1 and i1+i2=−i3, respectively.

Subsequently, calculated currents for the three phases are obtained from the currents of the two phases detected during the time periods which are as long as the minimum time period tmin utilizing the fact that the sum of the three-phase currents is zero. Here, the fact that the sum of the currents of the three phases becomes zero is true only if the currents of all the phases have values detected at the same time and, therefore, the currents detected in accordance with the timing signals ts1 and ts2 are corrected to represent current values at the reference timing (t0) indicated in FIG. 4, for example. This correction may be made in the following fashion by the same method as used in the first embodiment.

$$\left.\begin{array}{l} i_1 = idc_1 - \dfrac{2Vdc/3}{L} \times tdelay_1 \\ i_1 + i_2 = idc_2 - \left(\dfrac{2Vdc/3}{L} \times tmin + \dfrac{Vdc/3}{L} tdelay_2\right) + \\ \left(\dfrac{Vdc/3}{L} \times tmin - \dfrac{Vdc/3}{L} tdelay_2\right) \\ i_3 = -i_1 - i_2 \end{array}\right\} \tag{4}$$

Since discussed here in the second embodiment is the case where the number of phases n is 3, operation performed in accordance with the timing signal ts2 is equivalent to detecting $-i_3=i_1+i_2$. Therefore, equations (4) can be simplified as follows:

$$\left.\begin{array}{l} i_1 = idc_1 - \dfrac{2Vdc/3}{L} \times tdelay_1 \\ i_1 + i_2 = -i_3 = idc_2 - \dfrac{Vdc/3}{L} \times tmin - \dfrac{2Vdc/3}{L} \times tdelay_2 \\ i_2 = -i_1 - i_3 \end{array}\right\} \quad (5)$$

Equations (4) and (5) above are equivalent to each other when modified.

According to the present second embodiment, the currents of the two phases detected at different timings by the current sensor 3 provided on the DC side are corrected to have values which would be obtained at the same reference timing (t0) and the current of the third phase is obtained by calculation on the basis of the sum of the corrected current values for the two phases as described above. It is therefore possible to reduce errors.

While the foregoing discussion of the second embodiment has dealt with the case where n=3, the discussion is also applicable to cases where n=4 or above.

In addition, the signals Gp1, Gp2, Gp3 for turning on the upper-arm switching devices may become H at timings successively offset by as much as tmin in any arbitrary order from the situation where all of the signals Gp1, Gp2, Gp3 are at the L level.

Third Embodiment

Presented in the following embodiments are examples of further applications of the power converting apparatuses that utilize the calculation for current correction described in the foregoing embodiments.

First, a third embodiment of this invention is characterized in that the signals Gp1, Gp2, ..., Gpn for turning on the upper-arm switching devices 6 are so generated as to become H at timings successively offset by as much as tmin from a situation where all of the signals Gp1, Gp2, ..., Gpn are at the L level in order of phases with increasing lengths of the ON periods t1, t2, ..., tn that define time periods during which the respective upper-arm switching devices 6 are kept on. This arrangement, if applied to the foregoing second embodiment, makes it possible to maximize the output voltages of the inverter 2.

The principle of this arrangement is explained with reference to FIG. 5 which depicts a case where n=3 and the signals Gp1, Gp2, Gp3 for turning on the upper-arm switching devices 6 become H at timings successively offset by as much as the minimum time period tmin from a situation where all of the signals Gp1, Gp2, Gp3 are at the L level. The signals Gp1, Gp2, Gp3 become H in order of increasing durations of the signals Gp1, Gp2, Gp3 and the ON periods.

Figure 5:
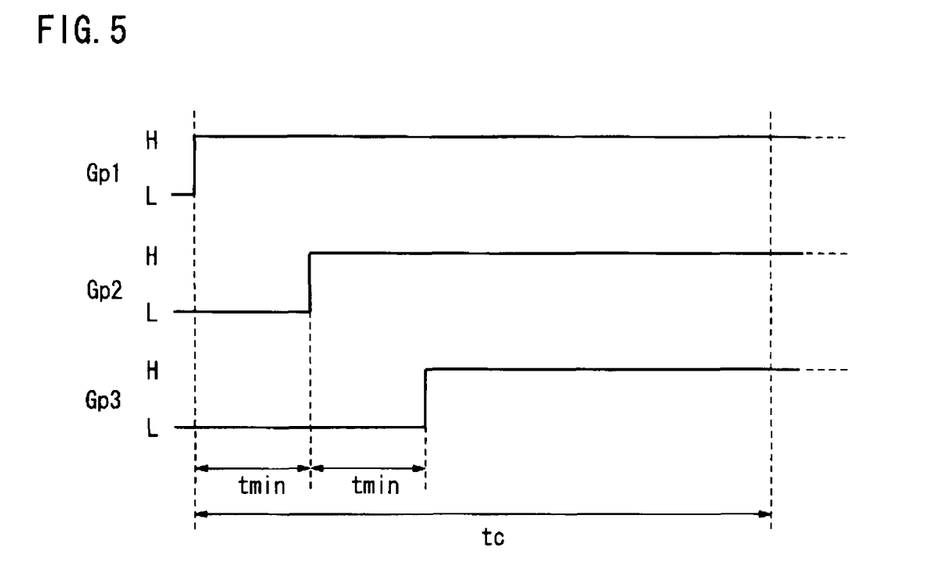
FIG. 5 is a diagram depicting the operating principle of a power converting apparatus according to a third embodiment of this invention by use of waveforms of ON/OFF signals.

During an arbitrary time duration tc indicated in FIG. 5, time periods during which the upper-arm switching devices 6 can be kept on is tc for the signal Gp1 for the first phase that first becomes on, tc−tmin for the signal Gp2 for the second phase that next becomes on, and tc−tmin×2 for the signal Gp3 for the third phase that lastly becomes on. This means that the voltages that can be output from the individual phases become progressively higher in order of the timings at which the upper-arm switching devices 6 are turned on.

The foregoing discussion indicates that if the signals Gp1, Gp2, ..., Gpn for turning on the upper-arm switching devices 6 are so generated as to become H at the timings successively offset by as much as tmin from the situation where all of the signals Gp1, Gp2, ..., Gpn are at the L level in order of increasing lengths of the ON periods t1, t2, ..., tn, it is possible to maximize the output voltages of the inverter 2 of the second embodiment.

While the foregoing discussion has dealt with the case where n=3, the discussion is also applicable to cases where n=4 or above.

Fourth Embodiment

Compared to the foregoing second embodiment, a fourth embodiment of this invention is characterized in that the order of phases in which the signals Gp1, Gp2, ..., Gpn for turning on the upper-arm switching devices 6 become H at timings successively offset by as much as tmin from a situation where all of the signals Gp1, Gp2, ..., Gpn are at the L level is periodically varied. This arrangement serves to smoothen frequencies of ripple currents induced by offsetting the timings at which the signals Gp1, Gp2, ..., Gpn become H, making it possible to reduce acoustic noise and vibrations caused by the ripple currents.

The principle of this arrangement is explained with reference to FIGS. 6 and 7 which depict a case where n=3 and the signals Gp1, Gp2, Gp3 for turning on the upper-arm switching devices 6 become H at timings successively offset by as much as the minimum time period tmin from a situation where all of the signals Gp1, Gp2, Gp3 are at the L level. It is to be noted however that the order in which the signals Gp1, Gp2, ..., Gpn become H is fixed, or unchanged, in FIG. 6 whereas the same is periodically varied in FIG. 7.

Figure 7:
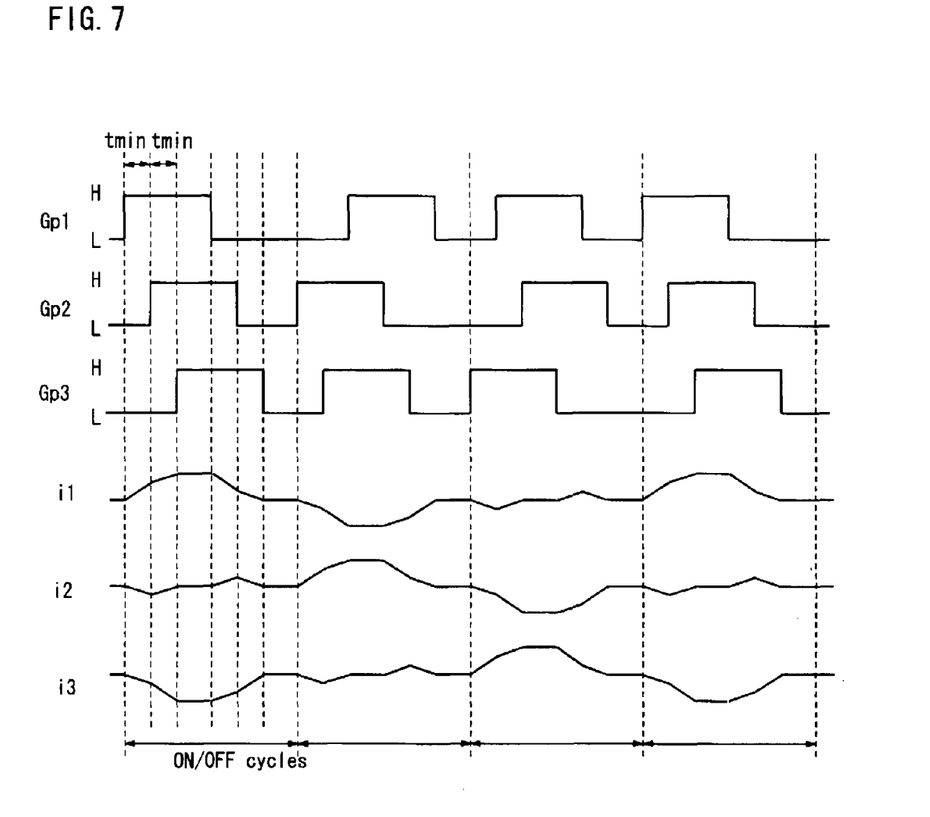
FIG. 7 is a diagram depicting waveforms of the ON/OFF signals and the AC currents according to the fourth embodiment.

In FIG. 7, the order in which the signals Gp1, Gp2, ..., Gpn become H is varied as shown in Table 1 which indicates a sequence of ON/OFF cycles in which the upper-arm switching devices 6 of the individual phases are turned on. Here, the "sequence of ON/OFF cycles" is defined as a process of turning on and off each of the upper-arm switching devices 6 once bringing the same from a state in which all of the upper-arm switching devices 6 are in an OFF state back to the state in which all of the upper-arm switching devices 6 are in the OFF state. As shown in Table 1, the sequence returns to the first ON/OFF cycle after the third ON/OFF cycle. For example, the order in which the signal Gp1 for the first phase becomes H is as follows: first in the first ON/OFF cycle, third in the second ON/OFF cycle, second in the third ON/OFF cycle, and first again in the subsequent first ON/OFF cycle.

TABLE 1

| | ON/OFF cycles | | |
| --- | --- | --- | --- |
| | Cycle 1 | Cycle 2 | Cycle 3 |
| 1st phase | 1 | 3 | 2 |
| 2nd phase | 2 | 1 | 3 |
| 3rd phase | 3 | 2 | 1 |

Figure 6:
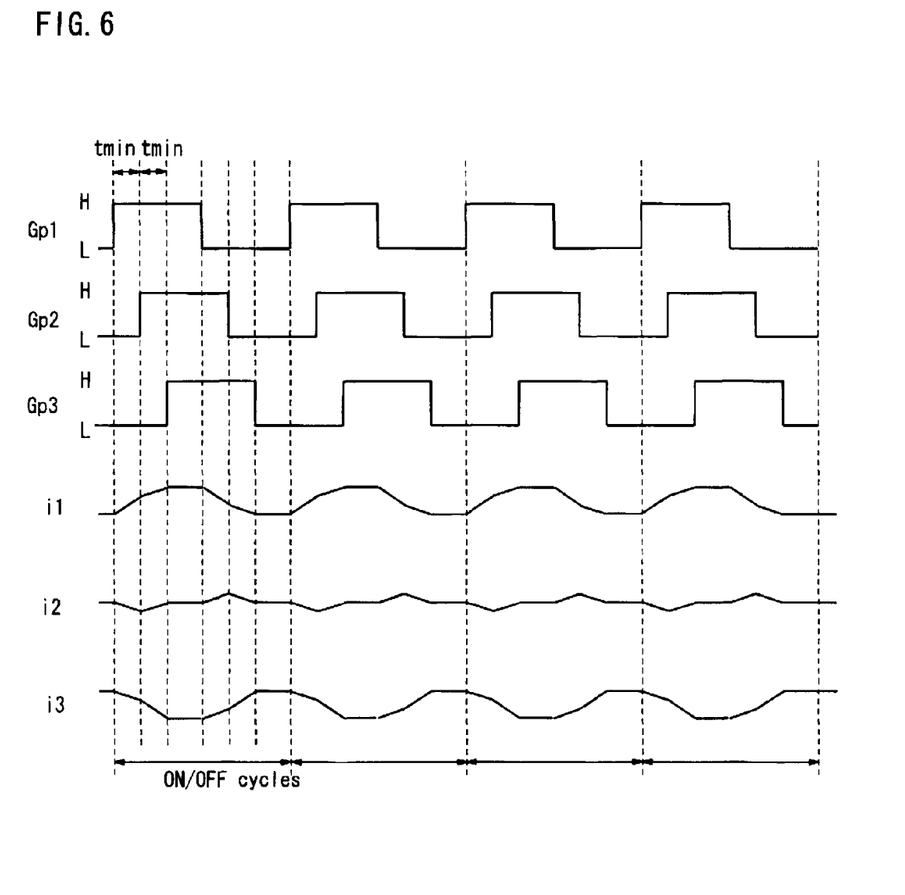
FIG. 6 is a diagram depicting waveforms of ON/OFF signals and AC currents in a case where order of phases in which signals for turning on upper-arm switching devices is unchanged as a reference for explaining operation of a power converting apparatus according to a fourth embodiment of this invention.

In the case of FIG. 6 where the order in which the signals Gp1, Gp2, ..., Gpn become H is fixed, ripple currents oriented in the same directions are always induced in the same phases in the AC currents i1, i2, i3. In contrast, in the case of FIG. 7 where the timings at which the signals Gp1, Gp2, ..., Gpn become H are periodically varied, ripple currents are uniformly distributed in the individual phases, forming smooth waveforms in which the ripple currents are oriented in positive and negative directions in a repetitive pattern. It is therefore possible to reduce acoustic noise and vibrations caused by the ripple currents.

While the order in which the signals Gp1, Gp2, ..., Gpn become H is periodically varied every three ON/OFF cycles as discussed above, the invention is not limited thereto. For example, the order in which the signals Gp1, Gp2, ..., Gpn become H may be varied every six ON/OFF cycles as shown in Table 2.

TABLE 2

| | ON/OFF cycles | | | | | |
|---|---|---|---|---|---|---|
| | Cycle 1 | Cycle 2 | Cycle 3 | Cycle 4 | Cycle 5 | Cycle 6 |
| 1st phase | 2 | 1 | 1 | 2 | 3 | 3 |
| 2nd phase | 3 | 3 | 2 | 1 | 1 | 2 |
| 3rd phase | 1 | 2 | 3 | 3 | 2 | 1 |

Also, while the foregoing discussion has dealt with the case where n=3, the discussion is also applicable to cases where n=4 or above.

Fifth Embodiment

Figure 8:
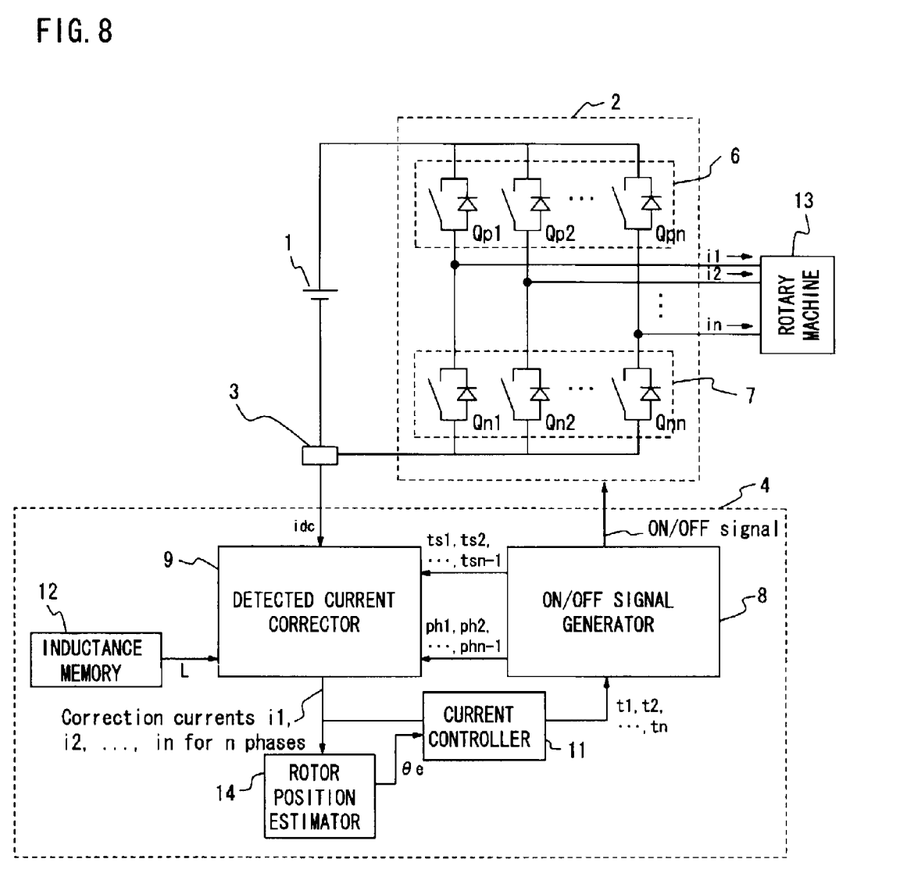
FIG. 8 is a diagram depicting the configuration of a power converting apparatus according to a fifth embodiment of this invention.

FIG. 8 illustrates the configuration of a power converting apparatus according to a fifth embodiment of the present invention. The fifth embodiment differs from the foregoing first to fourth embodiments in that the inductive load is a rotary machine 13, there is provided a rotor position estimator 14, and the current control unit 11 operates in a different way. This arrangement makes it possible to perform control operation for setting the rotary machine 13 in desired conditions in terms of torque, speed and rotor position, for example, by estimating the rotor position of the rotary machine 13 without the provision of a position sensor mounted on the rotary machine 13.

Referring to FIG. 8, the current control unit 11 outputs ON periods t1, t2, ..., tn during which the upper-arm switching devices 6 are kept on in order to control the rotary machine 13 to reach the desired conditions and apply voltages containing a later-described frequency component ωh differing from an operating frequency of the rotary machine 13 on the basis of the correction currents for the n phases fed from the detected current correction unit 9 and estimated rotor position θe of the rotary machine output from the rotor position estimator 14.

Described next is how the rotor position estimator 14 calculates the estimated rotor position θe.

If the rotary machine 13 is an interior permanent magnet synchronous machine, a voltage equation can be expressed by fixed Cartesian coordinates (α/β-axes) as equation (6) below:

$$\begin{bmatrix} V_{\alpha s} \\ V_{\beta s} \end{bmatrix} = \begin{bmatrix} R + sL_\alpha & sL_{\alpha\beta} \\ sL_{\alpha\beta} & R + sL_\beta \end{bmatrix} \begin{bmatrix} i_{\alpha s} \\ i_{\beta s} \end{bmatrix} + \omega\phi \begin{bmatrix} -\sin\theta \\ \cos\theta \end{bmatrix} \quad (6)$$

where $[V_{\alpha s}\ V_{\beta s}]^T$: voltages expressed by fixed Cartesian coordinates $[i_{\alpha s}\ i_{\beta s}]^T$: currents (2-phase currents) expressed by fixed Cartesian coordinates R: stator resistance s: differential operator $L_d$: d-axis inductance $L_q$: q-axis inductance ω: angular velocity (electrical angle)

θ: phase difference between a-axis and magnetic pole

φ: magnetic flux produced by magnet $$\begin{cases} L = \dfrac{L_d + L_q}{2} \\ l = \dfrac{L_d - L_q}{2} \end{cases} \begin{cases} L_\alpha = L + l\cos2\theta \\ L_\beta = L - l\cos2\theta \\ L_{\alpha\beta} = l\sin2\theta \end{cases}$$

Assuming that the rotary machine 13 is at rest or running at quite a low speed and substituting ω=0, currents iαs and iβs can be expressed by fixed Cartesian coordinates as equation (7) below:

$$\begin{bmatrix} i_{\alpha s} \\ i_{\beta s} \end{bmatrix} = \begin{bmatrix} R + L_{\alpha s} & L_{\alpha\beta s} \\ L_{\alpha\beta s} & R + L_{\beta s} \end{bmatrix}^{-1} \begin{bmatrix} V_{\alpha s} \\ V_{\beta s} \end{bmatrix} \quad (7)$$

If three-phase AC voltages of which frequency is ωh are applied on the assumption that the frequency ωh is sufficiently high, relationships R<<Lαωh and R<<Lβωh are satisfied. Ignoring the influence of stator resistance R, equation (7) can be rewritten as equation (8) below:

$$\begin{aligned} \begin{bmatrix} i_{\alpha s} \\ i_{\beta s} \end{bmatrix} &= \begin{bmatrix} L_\alpha s & L_{\alpha\beta} s \\ L_{\alpha\beta} s & L_\beta s \end{bmatrix}^{-1} \begin{bmatrix} V_{\alpha s} \\ V_{\beta s} \end{bmatrix} \\ &= \dfrac{1}{L_\alpha L_\beta - L_{\alpha\beta}^2} \begin{bmatrix} L_\alpha s & -L_{\alpha\beta} s \\ -L_{\alpha\beta} s & L_\beta s \end{bmatrix} \begin{bmatrix} V_{\alpha s} \\ V_{\beta s} \end{bmatrix} \\ &= \dfrac{sL}{(L^2 - l^2)s^2} \begin{bmatrix} V_{\alpha s} \\ V_{\beta s} \end{bmatrix} + \dfrac{sl}{(L^2 - l^2)s^2} \begin{bmatrix} -\cos2\theta & -\sin2\theta \\ -\sin2\theta & \cos2\theta \end{bmatrix} \begin{bmatrix} V_{\alpha s} \\ V_{\beta s} \end{bmatrix} \\ &= \dfrac{1}{(L^2 - l^2)s} \begin{bmatrix} L - l\cos2\theta & -l\sin2\theta \\ -l\sin2\theta & L + l\cos2\theta \end{bmatrix} \begin{bmatrix} V_{\alpha s} \\ V_{\beta s} \end{bmatrix} \end{aligned} \quad (8)$$

The voltages having the frequency ωh are expressed by fixed Cartesian coordinates as equations (9) below. Substituting these voltages in place of voltages $[V_{\alpha s}\ V_{\beta s}]^T$ expressed by fixed Cartesian coordinates in equation (8), the currents iαs and iβs can be expressed by equations (10) below:

$$\begin{cases} V_{\alpha sh} = V_{\alpha\beta h}\sin\omega_h t \\ V_{\beta sh} = V_{\alpha\beta h}\cos\omega_h t \end{cases} \quad (9)$$

$$\begin{aligned} i_{\alpha s} &= \dfrac{V_{\alpha\beta}}{(L^2 - l^2)j\omega_h}\{(L - l\cos2\theta)\sin\omega_h t - l\sin2\theta\cos\omega_h t\} \\ &= -j\dfrac{V_{\alpha\beta}}{(L^2 - l^2)\omega_h}\sqrt{L^2 + l^2 - 2Ll\cos2\theta}\cdot\sin(\omega_h t - \varphi_\alpha) \\ i_{\beta s} &= \dfrac{V_{\alpha\beta}}{(L^2 - l^2)j\omega_h}\{-l\sin2\theta\sin\omega_h t + (L + l\cos2\theta)\cos\omega_h t\} \\ &= -j\dfrac{V_{\alpha\beta}}{(L^2 - l^2)\omega_h}\sqrt{L^2 + l^2 + 2Ll\cos2\theta}\cdot\cos(\omega_h t + \varphi_\beta) \end{aligned} \quad (10)$$

where $$\varphi_\alpha = \tan^{-1}\left(\dfrac{l\sin2\theta}{L - l\cos2\theta}\right)$$

$$\varphi_\beta = \tan^{-1}\left(\dfrac{l\sin2\theta}{L + l\cos2\theta}\right)$$

Position information θ is contained in amplitudes of the currents iαs, iµs expressed by fixed Cartesian coordinates as indicated in equations (10) above, and the estimated rotor position θe can be calculated from this information.

Described below is a procedure for calculating the estimated rotor position θe by using equations (10).

From the current values detected in the foregoing embodiments, the amplitudes Iαs, Iβs of the currents iαs, iβs expressed by fixed Cartesian coordinates are extracted by Fourier transform. Then, using the extracted amplitudes Iαs, Iβs, a calculation indicated in equation (11) below is performed to extract a term containing only the position information θ.

$$\Delta I_{\alpha\beta} = I_{\beta s}^2 - I_{\alpha s}^2 \quad (11)$$

$$= \left\{ -j\frac{V_{\alpha\beta}}{(L^2 - 1^2)\omega_h}\sqrt{L^2 + 1^2 + 2L1\cos 2\theta} \right\}^2 -$$

$$\left\{ -j\frac{V_{\alpha\beta}}{(L^2 - 1^2)\omega_h}\sqrt{L^2 + 1^2 - 2L1\cos 2\theta} \right\}^2$$

$$= \frac{4V_{\alpha\beta}^2 L1}{(L^2 - 1^2)^2 \omega_h^2}\cos 2\theta$$

$$\frac{4V_{\alpha\beta}^2 L1}{(L^2 - 1^2)^2 \omega_h^2} \quad (12)$$

Dividing $\Delta I_{\alpha\beta}$ of equation (11) by the expression (12) above, only cos 2θ is extracted. Then, calculating the arc cosine of cos 2θ, 2θ (position information θ) is obtained to determine the estimated rotor position θe.

Incidentally, the estimated rotor position θe may be determined from the position information θ obtained on the basis of a value of cos 2θ stored in a memory device having a table holding values of cos 2θ prepared in advance instead of calculating the arc cosine of cos 2θ.

According to this rotor position calculating procedure, the rotor position of the rotary machine can be calculated by using only the rotary machine currents detected by applying the foregoing embodiments and, therefore, the present embodiment is advantageous in that computational complexity can be reduced. It should be noted however that the invention is not limited to the aforementioned rotor position calculating procedure.

As will be appreciated from the foregoing, it is possible to configure a power converting apparatus with a small number of components that can calculate AC currents with small errors by use of the current sensor 3 provided on the DC side and control the rotary machine to achieve the desired conditions without the provision of a rotation sensor according to the fifth embodiment.

While the present invention has been described with reference to the working of the upper-arm switching devices 6 in the foregoing individual embodiments, the invention may be described with reference to the working of the lower-arm switching devices 7.

Also, although the AC currents are corrected on the basis of the value of the voltage of the DC power supply 1 and the value of the inductance of the inductive load 5 in the foregoing individual embodiments, more accurate values of the AC currents will be obtained in the case where the inductive load 5 is the rotary machine 13 if the AC currents are corrected on the basis of the value of a voltage including the voltage of the DC power supply 1 and a voltage induced in the rotary machine 13 and the value of the inductance of the inductive load 5.

Furthermore, while the ON/OFF signals for the inverter 2 are generated by using the correction currents for the n phases fed from the detected current correction unit 9 in the foregoing individual embodiments, the inverter 2 may be operated by using predefined ON/OFF signals while just examining the correction currents for the n phases.

INDUSTRIAL APPLICABILITY

The present invention is widely applicable to power converting apparatuses provided with various kinds of inverters. The invention makes it possible to detect AC currents of individual phases with high accuracy by use of simple and inexpensive means and to perform various control operations by using thus detected current values.

The invention claimed is:

1. A power converting apparatus comprising:
a DC power supply;
an inverter including upper-arm switching devices for n phases (where n is an integer equal to or larger than 3), each of the upper-arm switching devices having one end connected to a positive side of said DC power supply and lower-arm switching devices for the n phases connected in series with the upper-arm switching devices of the respective phases, each of the lower-arm switching devices having one end connected to a negative side of said DC power supply, said inverter being configured to supply AC voltages for the n phases to an inductive load which is connected to connecting points between the upper-arm switching devices and the lower-arm switching devices of the individual phases by controlling the upper-arm switching devices and the lower-arm switching devices to turn on and off;
a current sensor for detecting a current that flows between said DC power supply and said inverter;
an ON/OFF signal generating unit for outputting ON/OFF signals to the upper-arm switching devices and the lower-arm switching devices;
a timing signal generator provided in said ON/OFF signal generating unit for generating timing signals used for setting timings at which currents of the individual phases flowing into said inductive load are detected;
a phase determination signal generator provided in said ON/OFF signal generating unit for generating phase determination signals used for determining the phase of the current that flows in said current sensor at each of the timings set by the timing signals; and
a detected current correction unit for determining detected current values fed from said current sensor at the timings set by the timing signals and phases of the detected current values on the basis of the timing signals and the phase determination signals and correcting the detected current values for the individual phases obtained at the individual timings during specific periods to represent values which would be obtained at a specific reference timing,
wherein said detected current correction unit corrects the detected current values for the individual phases obtained at the individual timings during the specific periods to represent the values which would be obtained at the specific reference timing on the basis of a voltage value of said DC power supply and an inductance value of said inductive load.

2. The power converting apparatus according to claim 1, wherein said inverter employs pulse width modulation (PWM) control and said detected current correction unit corrects the detected current values for the individual phases obtained at the individual timings during successive PWM cycles at intervals of the PWM cycles to represent the values which would be obtained at the specific reference timing.

3. The power converting apparatus according to claim 1, wherein said ON/OFF signal generating unit generates the ON/OFF signals which cause the upper-arm switching devices or the lower-arm switching devices of the individual phases to successively turn on at specific time intervals from a state in which the upper-arm switching devices or the lower-arm switching devices of all the phases are in an OFF state.

4. The power converting apparatus according to claim 3, wherein ON periods of the upper-arm switching device and the lower-arm switching device of each phase are so arranged as to not overlap each other.

5. The power converting apparatus according to claim 3, wherein the currents of the n−1 phases among the currents of the n phases are expressed by the current values corrected by said detected current correction unit to represent the values which would be obtained at the specific reference timing and the current of the remaining one phase is expressed by the value equal to (the sum of the corrected current values for the n−1 phases)×(−1).

6. The power converting apparatus according to claim 1, wherein said ON/OFF signal generating unit generates the ON/OFF signals which cause the upper-arm switching devices or the lower-arm switching devices of the individual phases to turn on at specific time intervals in order of phases with increasing lengths of ON periods from a state in which the upper-arm switching devices or the lower-arm switching devices of all the phases are in an OFF state.

7. The power converting apparatus according to claim 1, wherein said ON/OFF signal generating unit generates the ON/OFF signals which cause the upper-arm switching devices or the lower-arm switching devices of the individual phases to successively turn on at specific time intervals from a state in which the upper-arm switching devices or the lower-arm switching devices of all the phases are in an OFF state, and wherein the order of phases in which the upper-arm switching devices or the lower-arm switching devices are successively turned on is varied at specific intervals.

8. The power converting apparatus according to claim 1 further comprising a current control unit for calculating ON periods of the upper-arm switching device and the lower-arm switching device of the individual phases on the basis of the detected current values for the individual phases corrected by said detected current correction unit to represent the values which would be obtained at the specific reference timing and outputting the ON periods to said ON/OFF signal generating unit in order that desired AC voltages for the n phases are supplied to said inductive load.

9. The power converting apparatus according to claim 1, wherein said inductive load is a rotary machine and said ON/OFF signal generating unit generates the ON/OFF signals in such a manner that a voltage component of a frequency differing from an operating frequency of said rotary machine is superimposed on the output voltages of said inverter; and
    wherein the power converting apparatus further comprises
        a rotor position estimator for calculating an estimated rotor position of said rotary machine on the basis of the frequency component of the superimposed voltage extracted from the detected current values for the individual phases corrected by said detected current correction unit to represent the values which would be obtained at the specific reference timing.

10. A power converting apparatus comprising:
    a DC power supply;
    an inverter including upper-arm switching devices for n phases (where n is an integer equal to or larger than 3), each of the upper-arm switching devices having one end connected to a positive side of said DC power supply and lower-arm switching devices for the n phases connected in series with the upper-arm switching devices of the respective phases, each of the lower-arm switching devices having one end connected to a negative side of said DC power supply, said inverter being configured to supply AC voltages for the n phases to an inductive load which is connected to connecting points between the upper-arm switching devices and the lower-arm switching devices of the individual phases by controlling the upper-arm switching devices and the lower-arm switching devices to turn on and off;
    a current sensor for detecting a current that flows between said DC power supply and said inverter;
    an ON/OFF signal generating unit for outputting ON/OFF signals to the upper-arm switching devices and the lower-arm switching devices;
    a timing signal generator provided in said ON/OFF signal generating unit for generating timing signals used for setting timings at which currents of the individual phases flowing into said inductive load are detected;
    a phase determination signal generator provided in said ON/OFF signal generating unit for generating phase determination signals used for determining the phase of the current that flows in said current sensor at each of the timings set by the timing signals; and
    a detected current correction unit for determining detected current values fed from said current sensor at the timings set by the timing signals and phases of the detected current values on the basis of the timing signals and the phase determination signals and correcting the detected current values for the individual phases obtained at the individual timings during specific periods to represent values which would be obtained at a specific reference timing,
    wherein said inductive load is a rotary machine and said detected current correction unit corrects the detected current values for the individual phases obtained at the individual timings during the specific periods to represent the values which would be obtained at the specific reference timing on the basis of a voltage value of said DC power supply, an induced voltage value of said rotary machine and an inductance value of said inductive load.

11. The power converting apparatus according to claim 10, wherein said inverter employs pulse width modulation (PWM) control and said detected current correction unit corrects the detected current values for the individual phases obtained at the individual timings during successive PWM cycles at intervals of the PWM cycles to represent the values which would be obtained at the specific reference timing.

12. The power converting apparatus according to claim 10, wherein said ON/OFF signal generating unit generates the ON/OFF signals which cause the upper-arm switching devices or the lower-arm switching devices of the individual phases to successively turn on at specific time intervals from a state in which the upper-arm switching devices or the lower-arm switching devices of all the phases are in an OFF state.

13. The power converting apparatus according to claim 12, wherein ON periods of the upper-arm switching device and the lower-arm switching device of each phase are so arranged as to not overlap each other.

14. The power converting apparatus according to claim 12, wherein the currents of the n−1 phases among the currents of the n phases are expressed by the current values corrected by said detected current correction unit to represent the values which would be obtained at the specific reference timing and the current of the remaining one phase is expressed by the value equal to (the sum of the corrected current values for the n−1 phases)×(−1).

15. The power converting apparatus according to claim 10, wherein said ON/OFF signal generating unit generates the ON/OFF signals which cause the upper-arm switching devices or the lower-arm switching devices of the individual phases to turn on at specific time intervals in order of phases with increasing lengths of ON periods from a state in which the upper-arm switching devices or the lower-arm switching devices of all the phases are in an OFF state.

16. The power converting apparatus according to claim 10, wherein said ON/OFF signal generating unit generates the ON/OFF signals which cause the upper-arm switching devices or the lower-arm switching devices of the individual phases to successively turn on at specific time intervals from a state in which the upper-arm switching devices or the lower-arm switching devices of all the phases are in an OFF state, and wherein the order of phases in which the upper-arm switching devices or the lower-arm switching devices are successively turned on is varied at specific intervals.

17. The power converting apparatus according to claim 10 further comprising a current control unit for calculating ON periods of the upper-arm switching device and the lower-arm switching device of the individual phases on the basis of the detected current values for the individual phases corrected by said detected current correction unit to represent the values which would be obtained at the specific reference timing and outputting the ON periods to said ON/OFF signal generating unit in order that desired AC voltages for the n phases are supplied to said inductive load.

18. The power converting apparatus according to claim 10, wherein said inductive load is a rotary machine and said ON/OFF signal generating unit generates the ON/OFF signals in such a manner that a voltage component of a frequency differing from an operating frequency of said rotary machine is superimposed on the output voltages of said inverter; and wherein the power converting apparatus further comprises a rotor position estimator for calculating an estimated rotor position of said rotary machine on the basis of the frequency component of the superimposed voltage extracted from the detected current values for the individual phases corrected by said detected current correction unit to represent the values which would be obtained at the specific reference timing.

* * * * *

UNITED STATES PATENT AND TRADEMARK OFFICE
CERTIFICATE OF CORRECTION

PATENT NO. : 8,878,482 B2
APPLICATION NO. : 13/318812
DATED : November 4, 2014
INVENTOR(S) : Tetsuya Kojima et al.

It is certified that error appears in the above-identified patent and that said Letters Patent is hereby corrected as shown below:

In the Specification,

In column 10, lines 5–8:

$$\left( \begin{array}{l} L = \dfrac{L_d + L_q}{2} \\ 1 = \dfrac{L_2 - L_q}{2} \end{array} \right. \quad \left( \begin{array}{l} L_\alpha = L + 1\cos2\theta \\ L_\beta = L - 1\cos2\theta \\ L_{\alpha\beta} = 1\sin2\theta \end{array} \right.$$

should read as:

$$\left( \begin{array}{l} L = \dfrac{L_d + L_q}{2} \\ 1 = \dfrac{L_d - L_q}{2} \end{array} \right. \quad \left( \begin{array}{l} L_\alpha = L + l\cos2\theta \\ L_\beta = L - l\cos2\theta \\ L_{\alpha\beta} = l\sin2\theta \end{array} \right.$$

Signed and Sealed this
Seventh Day of April, 2015

Michelle K. Lee
*Director of the United States Patent and Trademark Office*